United States Patent

[11] 3,622,737

| [72] | Inventor | John J. Trudeau, deceased<br>late of Detroit, Mich. by Margaret L.<br>Trudeau, administratrix, 8237 Bramwell,<br>Detroit, Mich. 48239 |
|---|---|---|
| [21] | Appl. No. | 42,363 |
| [22] | Filed | June 1, 1970 |
| [45] | Patented | Nov. 23, 1971 |

[54] FOIL SEAL FOR GAS TURBINE REGENERATOR
2 Claims, 5 Drawing Figs.

[52] U.S. Cl. ................................................ 165/9,
277/95, 277/96
[51] Int. Cl. ........................................... F16j 15/32
[50] Field of Search .......................................... 165/9;
60/39, 51 R; 277/1, 95, 96, 81

[56] References Cited
UNITED STATES PATENTS

| 3,234,999 | 2/1966 | Atwood.......................... | 277/81 |
| 3,273,903 | 9/1966 | Chapman et al.............. | 165/9 |
| 3,273,905 | 9/1966 | Chapman et al.............. | 165/9 |

*Primary Examiner*—Robert I. Smith
*Attorneys*—John R. Faulkner and Glenn S. Arendsen ABSTRACT: A flexible foil is inserted loosely in a slot formed in the housing side of a shoe-type seal for a rotating regenerator. Tabs attached to each end of the foil bear against the shoe and prevent the foil from sliding longitudinally out of the groove. The slot preferably is formed by folding a projecting ledge of the shoe along one longitudinal edge toward an inclined surface of the shoe. A circular wire can be inserted in the folded joint to produce a slot having a substantially uniform width throughout its entire depth.

PATENTED NOV 23 1971          3,622,737

JOHN J. TRUDEAU-DECEASED
BY MARGARET TRUDEAU
ADMINISTRATRIX
INVENTOR.

BY John R. Faulkner
Glenn S. Arendsen
ATTORNEYS

FOIL SEAL FOR GAS TURBINE REGENERATOR

SUMMARY OF THE INVENTION

Foil-type seals are extremely advantageous for sealing the area between a rotating regenerator and the housing of a gas turbine engine because the foils are capable of absorbing large differences in thermal expansion. In early constructions the foil was welded to the shoe at several points along its length. Thermally induced dimensional changes caused wrinkling and distortion of the resulting construction when subjected to the wide temperature ranges encountered in gas turbine engines, however. Alternate arrangements involved locating a loose foil in a retainer or inserting both longitudinal edges of a loose foil into slots in the shoe.

This invention provides an alternative technique of retaining a loose foil in a slot of a shoe that slides against a rotating regenerator. In a gas turbine engine having a regenerator rotating in a housing with sectors of the regenerator being subjected to gas streams of different pressures, the foil sealing arrangement for the regenerator provided by this invention comprises a shoe positioned in the housing where one surface faces the regenerator and the other surface faces the housing. The regenerator slides on the shoe surface it faces. A longitudinal groove is formed in the other shoe surface and a flexible foil is positioned loosely in the groove with the outer edge of the foil bearing against the housing. Small tabs attached to each end of the foil bear against end portions of the shoe and retain the foil in the groove.

The sealing mechanism of this invention can be made by a highly economical process that begins by forming a shoe member with a projecting ledge along one longitudinal edge. An inclined surface sloping from the shoe surface intended to face the housing toward the projecting ledge also is formed. The projecting ledge is folded or rolled toward the inclined surface to define a narrow space between the folded ledge and the inclined surface. One longitudinal edge of a foil is inserted into the narrow space with the other longitudinal edge extending above the surface of the shoe to bear against the engine housing.

In a preferred construction, a circular sector preferably is formed at the junction of the inclined surface and the projecting ledge and a circular wire is placed in the sector. The projecting ledge is folded toward the inclined surface around the wire, which insures that the space between the ledge and the inclined surface has a substantially constant height for its entire depth. Small cutouts are located at each end of the shoe to receive the retaining tabs.

DETAILED DESCRIPTION

Figure 1:
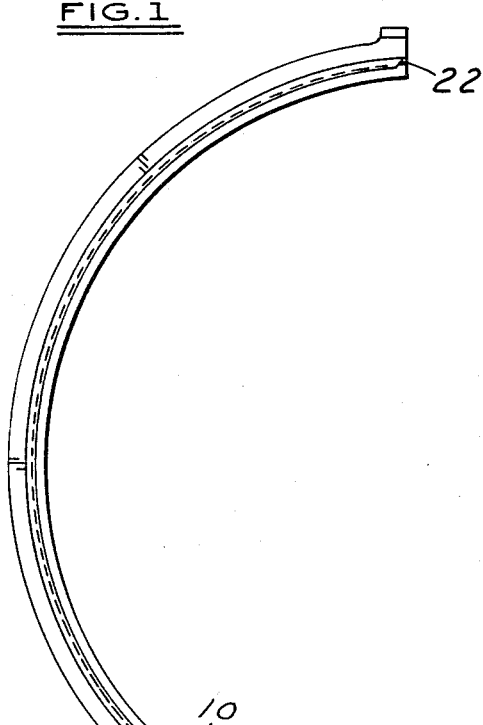
FIG. 1 is a plan view of a shoe for a C-shaped seal showing the projecting ledge, the inclined surface, the circular sector between the inclined surface and the projecting ledge.
Figure 2:
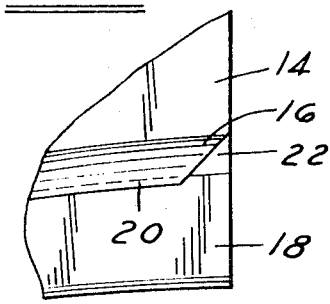
FIG. 2 is an enlarged plan view of an end of the shoe showing a small triangular cutout designed to receive the retaining tabs.
Figure 3:
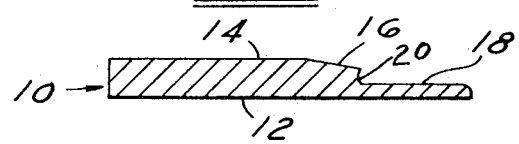
FIG. 3 is a sectional view taken along line 3—3 in FIG. 1 that shows the ledge, inclined surface, and circular section.

Referring to FIGS. 1, 2 and 3, a C-shaped shoe for a gas turbine engine regenerator seal is designated by numeral 10. Shoe 10 has a pair of substantially parallel surfaces 12 and 14 with surface 14 extending only partially across the top of the shoe. An inclined surface 16 extends from surface 14 toward a projecting ledge 18 formed on the inner periphery of the shoe. Surface 16 terminates a short distance above the upper surface of ledge 18 as shown in FIG. 3.

A sector 20 of a circle is formed in the space between the end of surface 16 and the upper surface of ledge 18 as shown in FIG. 3. Sector 20 comprises more than 90° of a complete circle and preferably includes about 120°–170° of the circle. At each end of shoe 10 a small triangular portion is cut out of inclined surface 16 to form a triangular space 22.

Figure 4:
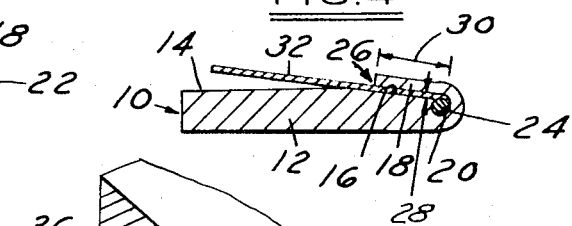
FIG. 4 shows a complete sealing member after the projecting ledge has been folded over toward the inclined surface and a foil has been located in the resulting groove.
Figure 5:
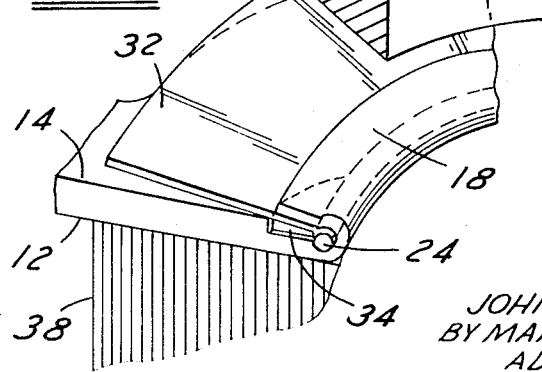
FIG. 5 is a view showing the location of the sealing member in a gas turbine engine between the rotating regenerator and a member of the engine housing.

A circular wire 24 having a cross-sectional shape conforming substantially to the curvature of sector 20 is located in sector 20 and ledge 18 is rolled over wire 24 toward inclined surface 16 as shown in FIG. 4. Wire 24 produces a smoothly rounded fold and its size is selected so the folding operation produces a narrow space 26 between the ledge and inclined surface 16 that has a substantially uniform width (represented by dimension 28 in FIG. 4) for the entire depth of surface 16 (this depth is represented by dimension 30).

A flexible foil 32 then is inserted into space 26. The foil is designed to fit loosely within space 26, and a small triangular tab 34 is spotwelded to each end of foil 32 where tabs 34 fit into the triangular spaces 22. The tabs retain the foil in space 26 and prevent any longitudinal movement thereof. Spaces 22 preferably are slightly larger than tabs 34 to permit enough tab movement to absorb thermally induced dimension changes.

The resulting seal assembly is positioned in a gas turbine engine housing with the projecting edge of foil 32 bearing against the housing member 36 and surface 12 of the shoe sliding against a regenerator core 38. Engine operation produces a pressure differential radially across the seal installation with a higher pressure at the other periphery, and this differential maintains the outer edge of foil 32 in contact with housing 36.

Since the foil is retained only at its ends, it is free to flex relatively independently of the shoe. Shoe disassembly is effected easily by breaking the spotweld fastening a tab to the foil and sliding the foil longitudinally out of the space. If desired, triangular portions 22 can be formed in the ends of ledge 18 and the tabs attached to the outer surface of the foil.

In a useful assembly, a C-shaped shoe having a nominal radius of 14 inches and a width of about 1.2 inches has a projecting ledge about 0.02–0.04 inch thick and 0.7–0.8 inch wide formed on its inner periphery. Inclined surface 16 makes an angle of about 15° with surface 14. Sector 20 has a radius of about 0.020–0.025 inch and constitutes about 140° of a complete circle. A stainless steel wire having a diameter of 0.047 inch is positioned in sector 20 and ledge 18 is rolled over the wire toward surface 16 to define a space 26 having a width of about 0.007–0.010 inch. A foil 32 about 0.005 inch thick is inserted into space 26 and retaining tabs 34 are welded to each end where the tabs are positioned in small cutouts. The resulting seal operated satisfactorily throughout the temperature range of an automotive-type gas turbine engine.

Thus this invention provides a regenerator seal assembly that operates in wide temperature ranges without thermal distortion or wrinkling. The seal assembly is manufactured easily and inexpensively and provides an excellent low-cost installation.

It is claimed:

1. In a gas turbine engine having a regenerator rotating in a housing with sectors of said regenerator being subjected to gas streams of different pressures, a sealing means for said regenerator comprising a shoe positioned in said housing where one surface faces said regenerator and the other surface faces said housing, said regenerator sliding on the shoe surface it faces, the other surface of said shoe having a longitudinal groove therein, a foil positioned loosely in said groove with the outer edge of said foil bearing against said housing, and tabs attached to each end of the foil and bearing against the shoe, said tabs preventing said foil from sliding longitudinally out of said groove.

2. The invention of claim 1 in which said shoe has a space at each end of the longitudinal groove and the tabs fit in said spaces and bear against lateral surfaces of said shoe defining said spaces to prevent said foil from sliding longitudinally out of said groove.